(12) United States Patent
Burkhardt et al.

(10) Patent No.: US 9,110,739 B2
(45) Date of Patent: Aug. 18, 2015

(54) SUBSCRIBING TO MULTIPLE RESOURCES THROUGH A COMMON CONNECTION

(75) Inventors: John R. Burkhardt, Arlington, MA (US); Ransom Richardson, Beverly, MA (US); Jason Schleifer, Cambridge, MA (US); Steven Lees, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 556 days.

(21) Appl. No.: 13/155,164

(22) Filed: Jun. 7, 2011

(65) Prior Publication Data

US 2012/0317170 A1 Dec. 13, 2012

(51) Int. Cl.
G06F 15/16 (2006.01)
G06F 9/54 (2006.01)
H04L 29/08 (2006.01)

(52) U.S. Cl.
CPC .............. *G06F 9/542* (2013.01); *H04L 67/12* (2013.01); *G06F 2209/544* (2013.01)

(58) Field of Classification Search
CPC .......... G06F 15/16; G06F 9/542; H04L 67/12
USPC .......................................................... 709/203
See application file for complete search history.

(56) References Cited

U.S. PATENT DOCUMENTS

| | | | |
|---|---|---|---|
| 5,961,651 A * | 10/1999 | Gittins et al. | 714/5.11 |
| 6,477,564 B1 | 11/2002 | Freyssinet et al. | |
| 6,633,910 B1 * | 10/2003 | Rajan et al. | 709/224 |
| 6,751,657 B1 * | 6/2004 | Zothner | 709/220 |
| 7,702,675 B1 * | 4/2010 | Khosla et al. | 707/710 |
| 7,958,125 B2 * | 6/2011 | Yan et al. | 707/737 |
| 8,244,796 B1 * | 8/2012 | James et al. | 709/203 |
| 8,260,864 B2 * | 9/2012 | Sana et al. | 709/206 |
| 8,296,398 B2 * | 10/2012 | Lacapra et al. | 709/219 |
| 2002/0138582 A1 * | 9/2002 | Chandra et al. | 709/206 |
| 2003/0135553 A1 * | 7/2003 | Pendakur | 709/205 |
| 2004/0078464 A1 * | 4/2004 | Rajan et al. | 709/224 |
| 2005/0050148 A1 * | 3/2005 | Mohammadioun et al. | 709/206 |
| 2005/0132048 A1 * | 6/2005 | Kogan et al. | 709/225 |
| 2005/0144269 A1 * | 6/2005 | Banatwala et al. | 709/223 |
| 2005/0165743 A1 * | 7/2005 | Bharat et al. | 707/3 |
| 2005/0193341 A1 * | 9/2005 | Hayward et al. | 715/716 |
| 2006/0155698 A1 * | 7/2006 | Vayssiere | 707/6 |
| 2006/0173985 A1 * | 8/2006 | Moore | 709/223 |
| 2006/0190616 A1 * | 8/2006 | Mayerhofer et al. | 709/231 |

(Continued)

OTHER PUBLICATIONS

Hanson, et al., "A Flexible and Recoverable Client/Server Database Event Notification System", In Journal of the International Journal on Very Large Data Bases, vol. 7, Issue 1, Feb. 1998, 13 pages.

*Primary Examiner* — Guang Li
(74) *Attorney, Agent, or Firm* — Ben Tabor; Kate Drakos; Micky Minhas

(57) ABSTRACT

Methods, systems, and computer-readable media are provided to allow multiple server resources to share a single connection to a client device. The single connection may be maintained between a notification queue on the server side and the client device. Multiple server resources share the notification queue. When a resource changes or a service wants to communicate information to a client, corresponding messages are sent to the notification queue over a connection within the data center. Once in the notification queue, the updates are communicated to the client device.

20 Claims, 5 Drawing Sheets

(56) References Cited

U.S. PATENT DOCUMENTS

| | | | |
|---|---|---|---|
| 2006/0235885 A1* | 10/2006 | Steele et al. | 707/104.1 |
| 2007/0027932 A1* | 2/2007 | Thibeault | 707/200 |
| 2007/0043735 A1* | 2/2007 | Bodin et al. | 707/10 |
| 2007/0106754 A1* | 5/2007 | Moore | 709/217 |
| 2007/0118841 A1 | 5/2007 | Driver et al. | |
| 2007/0198677 A1* | 8/2007 | Ozhan et al. | 709/223 |
| 2007/0240170 A1* | 10/2007 | Surlaker et al. | 719/318 |
| 2008/0010294 A1* | 1/2008 | Norton et al. | 707/10 |
| 2008/0163318 A1* | 7/2008 | Chen et al. | 725/109 |
| 2008/0222654 A1 | 9/2008 | Xu et al. | |
| 2009/0222527 A1* | 9/2009 | Arconati et al. | 709/206 |
| 2010/0088300 A1 | 4/2010 | Gbadegesin et al. | |
| 2010/0228778 A1 | 9/2010 | MacLaurin | |
| 2011/0219094 A1* | 9/2011 | Turakhia | 709/217 |
| 2012/0231770 A1* | 9/2012 | Clarke et al. | 455/414.1 |
| 2013/0030875 A1* | 1/2013 | Lee et al. | 705/7.38 |

* cited by examiner

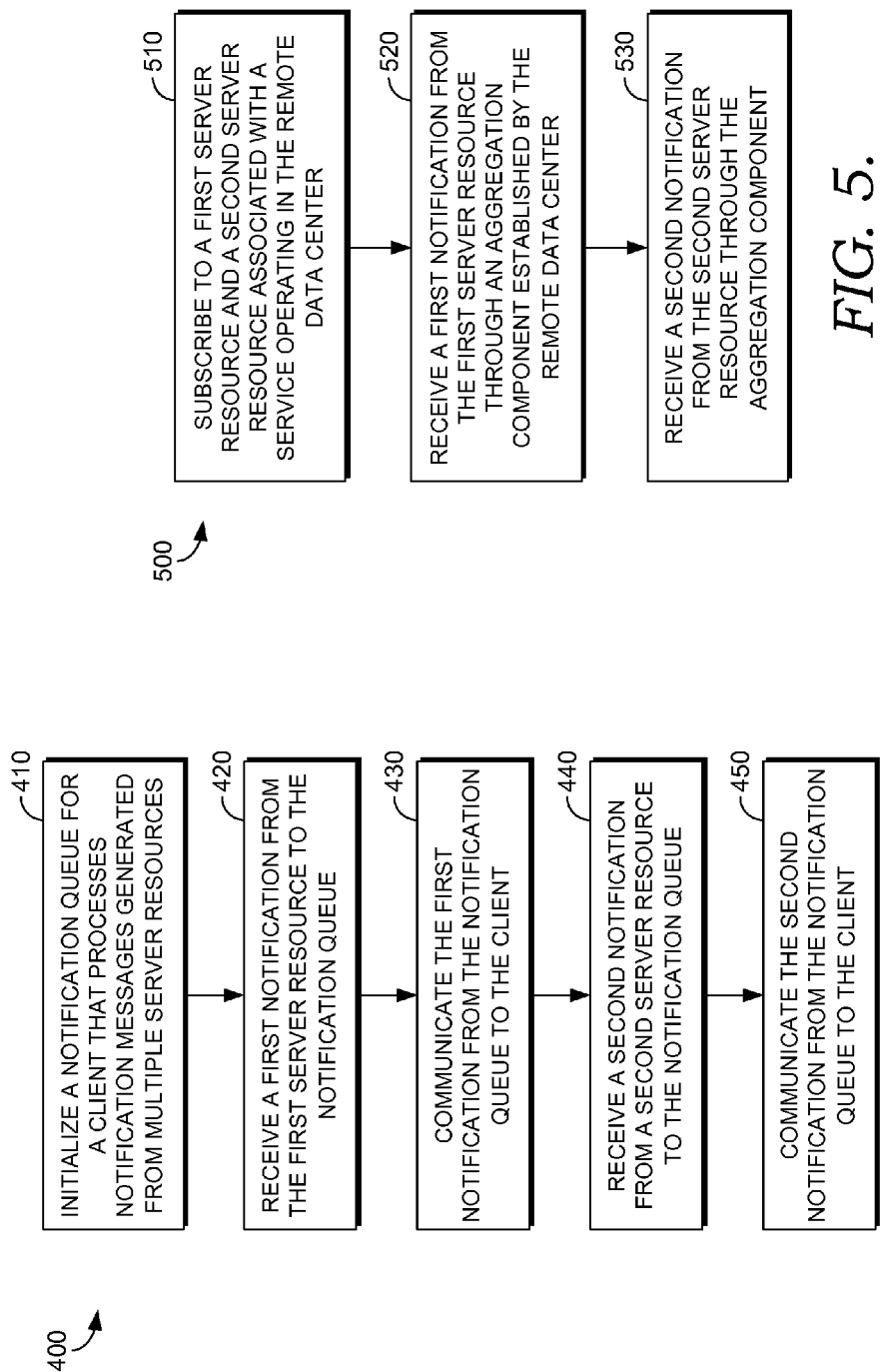

SUBSCRIBING TO MULTIPLE RESOURCES THROUGH A COMMON CONNECTION

BACKGROUND

Client devices may subscribe to server resources (e.g., a chat room) that passes data to the client through a connection. A client may subscribe to multiple resources at the same time. For example, if a client device is viewing multiple chat rooms simultaneously, then changes made in each chat room are communicated to the user.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention allow multiple server resources or services to share a single connection to a client device. The single connection may be maintained between a notification queue on the server side and the client device. The notification queue is associated with a data center that provides the server resources and services. Multiple server resources and/or services share the notification queue. When a service wants to send data to a client, then the data is sent to the notification queue over a connection within the data center. Once in the notification queue, the updates are communicated to the client device. Each client is assigned a notification queue when the client initially connects with the resource in a data center. When the client subscribes to additional resources or services on the server then the client notifications from those resources are sent to the notification queue.

BRIEF DESCRIPTION OF THE DRAWINGS

Embodiments of the invention are described in detail below with reference to the attached drawing figures, wherein:

FIG. 4 is flow chart showing a method for aggregating notifications from multiple server resources addressed to a common client, in accordance with an embodiment of the present invention;

FIG. 5 is flow chart showing a method of communicating with resources in a remote data center, in accordance with an embodiment of the present invention.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow multiple server resources or services to share a single connection to a client device. The single connection may be maintained between a notification queue on the server side and the client device. The notification queue is associated with a data center that provides the server resources and services. Multiple server resources and/or services share the notification queue. When a service wants to send data to a client, then the data is sent to the notification queue over a connection within the data center. Once in the notification queue, the updates are communicated to the client device. Each client is assigned a notification queue when the client initially connects with the resource in a data center. When the client subscribes to additional resources or services on the server then the client notifications from those resources are sent to the notification queue.

Having briefly described an overview of embodiments of the invention, an exemplary operating environment suitable for use in implementing embodiments of the invention is described below.

Exemplary Operating Environment

Figure 1:
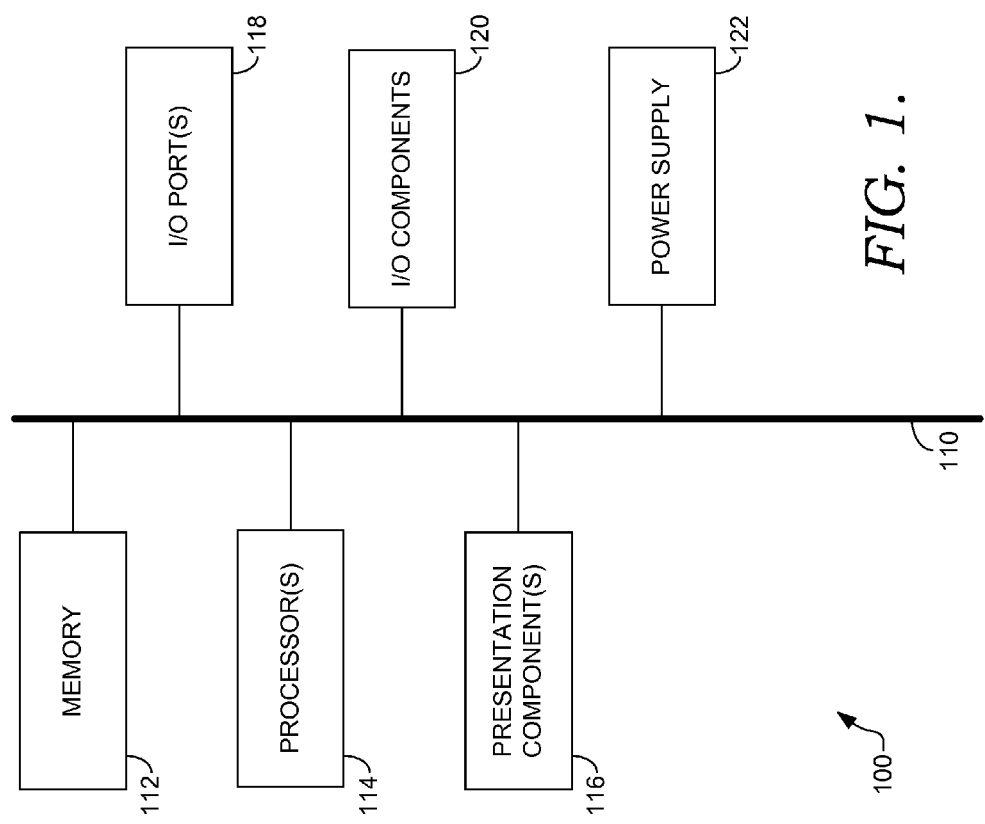
FIG. 1 is a block diagram of an exemplary computing environment suitable for implementing embodiments of the invention.

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100. Computer-storage media may be non-transitory.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary System Architecture

Figure 2:
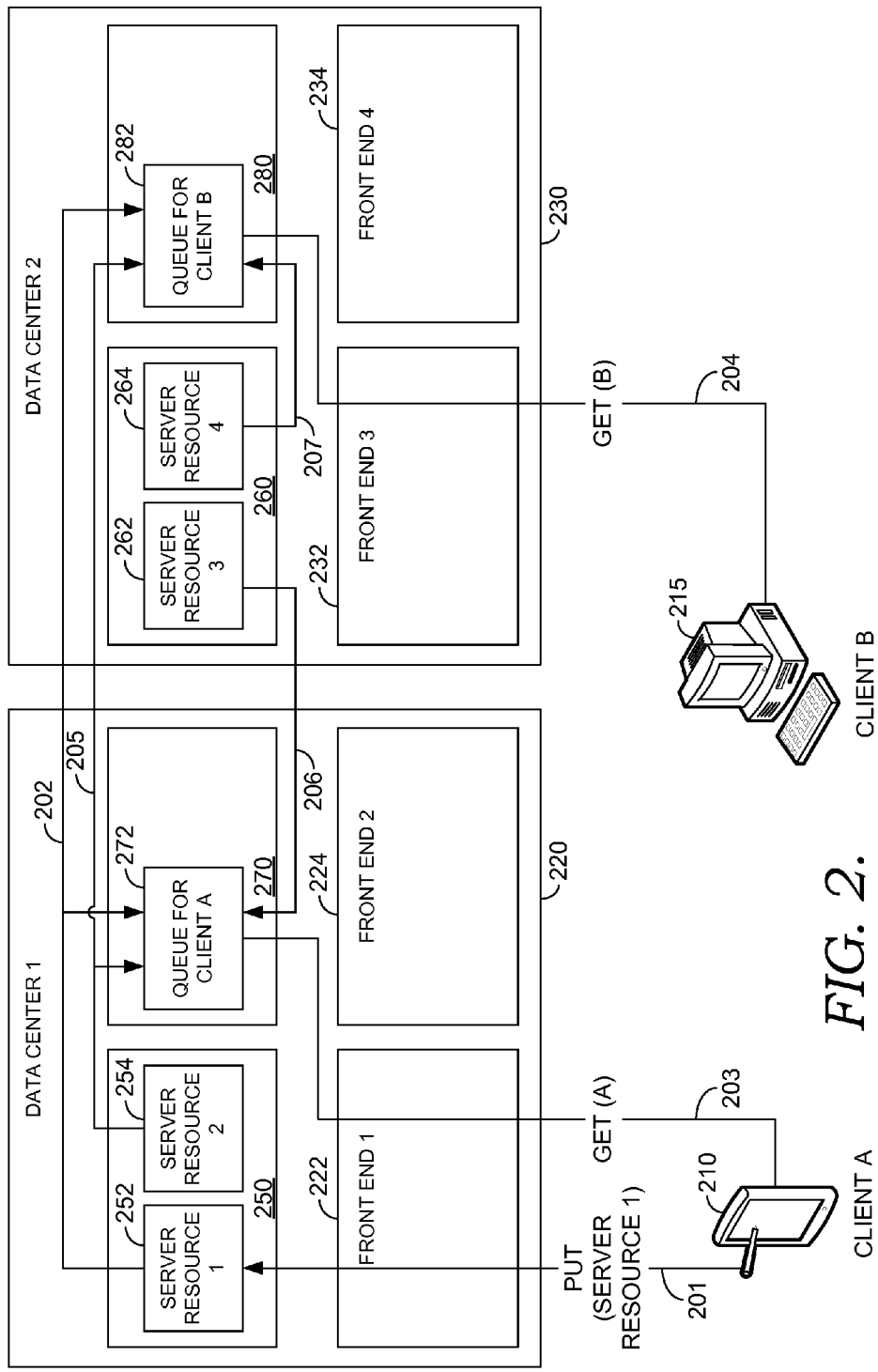
FIG. 2 is a diagram of a computing system architecture suitable for sharing a connection to a client device, in accordance with an embodiment of the present invention.

Turning now to FIG. 2, a computing environment 200 in which server resources may share a connection with a client is shown, in accordance with an embodiment of the present invention. The computing environment 200 shown in FIG. 2 is an example of one suitable computing environment 200. The computing environment 200 comprises on one or more computing devices similar to the computing device 100 described with reference to FIG. 1. The computing environment 200 should not be interpreted as having any dependency or requirement related to any single module/component or combination of modules/components illustrated therein. The computing environment 200 includes client A 210 and client B 215. Client A 210 is depicted as a slate computing device and client B 215 is depicted as a personal computer. Embodiments of the present invention are not limited to use with slates and personal computers. Other exemplary client devices include game consoles, smart phones, PDAs, and other computing devices capable of communicating with remote resources.

The computing environment 200 also includes data center 1 220 and data center 2 230. Data center 1 220 and data center 2 230 may be logically distinct from each other and/or physically distinct from each other. For example, the two data centers may reside in entirely different areas of a country or the world. In an alternative embodiment, the two data centers may reside in the same geographic location, but maintain logical or programmed partitions. Each data center may comprise multiple computing devices. Exemplary computing devices include servers, routers, and data storage devices. The various computing devices within a data center may host one or more services that interact with client devices.

Data center 1 220 includes service 1 250. A service provides a function to a client device. Example services include a game service, such as a chess game, where a player may play multiple games at the same time. Another example is a media sharing service that provides a shared playlist and information on what is currently playing. A further example is a presence service that provides updates status updates for users indicating who is connected to a service. Service 1 250 includes server resource 1 252 and server resource 2 254. This illustrates that a single service may support multiple resources. A resource is an instance of a service, such as a chat room in a chat service. In general, the server resources contain information that is periodically updated by clients. As the information is updated, the updates are communicated to client devices that are subscribing to the server resource. An individual client may subscribe to multiple services or to multiple resources within a service.

The connection with client devices may be managed separately from the server resources and services. Connection manager 270 receives updates from server resources, maintains notification queues, and communicates updates to client devices. The connection manager 270 may operate on a different computing device than the services. The connection manager 270 includes a notification queue 272 for client A that may receive updates from server resources and communicate them to a client. The front end 1 222 and front end 2 224 may serve a load balancing function within the data center. Front end 1 222 and front end 2 224 are included, in part, to illustrate that there may be several intermediary components (not shown), both physical and functional, that facilitate communication between the client devices and data centers.

The data center 2 230 includes service 2 260 and connection manager 280. The service 2 260 includes server resource 3 262 and server resource 4 264. The server resources 262 and 264 are similar to the server resources 252 and 254 described previously. Similarly, the connection manager 280 includes a notification queue 282 for client B that is similar to the notification queue 272 described previously. Further, the data center 2 230 includes front end 3 232 and front end 4 234. Again, the front ends may serve a load balancing purpose within the data center.

The lines between various components shown in computing environment 200 illustrate some of the communications that could occur as server resources share a connection. In the example shown, the communications are associated with a comet-style HTTP ("Hypertext Transfer Protocol") polling connection. Initially, a put message 201 is communicated from client A 210 to server resource 1 252. In response to the put message 201, the information within server resource 1 is updated. Once the information within server resource 1 252 has been updated, clients subscribing to server resource 1 need to receive the update. Accordingly, an update message 202 is communicated to notification queue 272 and notification queue 282. Once in the notification queues, the information may be retrieved when the queue responds to a get request.

Get request A 203 may be received before or after the update message 202 is received in notification queue 272. In general, a get request 203 may be maintained within a notification queue for a minute or more. When the client wishes to maintain a connection with the server resource, an additional get request is communicated to the notification queue when information is returned or a time period passes. Get request B 204 works in a similar manner to retrieve updates for client B 215.

As can be seen, server resource 2 254 sends an update 205 to the notification queue 272 and a notification queue 282. The update message received by server resource 2 254 is not shown in FIG. 2. This illustrates that in an actual environment, server resources could be subscribed to by many client devices, including those not shown in FIG. 2. In addition, an update could originate at the server resource and not be the result of a message from a client.

Server resource 3 262 also sends an update 206 to the notification queue 272. Server resource 4 264 sends an update message 207 to the notification queue 282. These updates illustrate that the server resources only provide updates to clients that have subscribed to the resource. A client could subscribe to less than all of the server resources available.

The communications shown in FIG. 2 illustrate that multiple server resources may share a single queue for a client. The connection between the server resources and the client is maintained through a single queue. In this case, the connection is maintained by the exchange of get requests. Embodiments of the present invention are not limited to the comet-style HTTP polling and could be used with other forms of connection.

Figure 3:
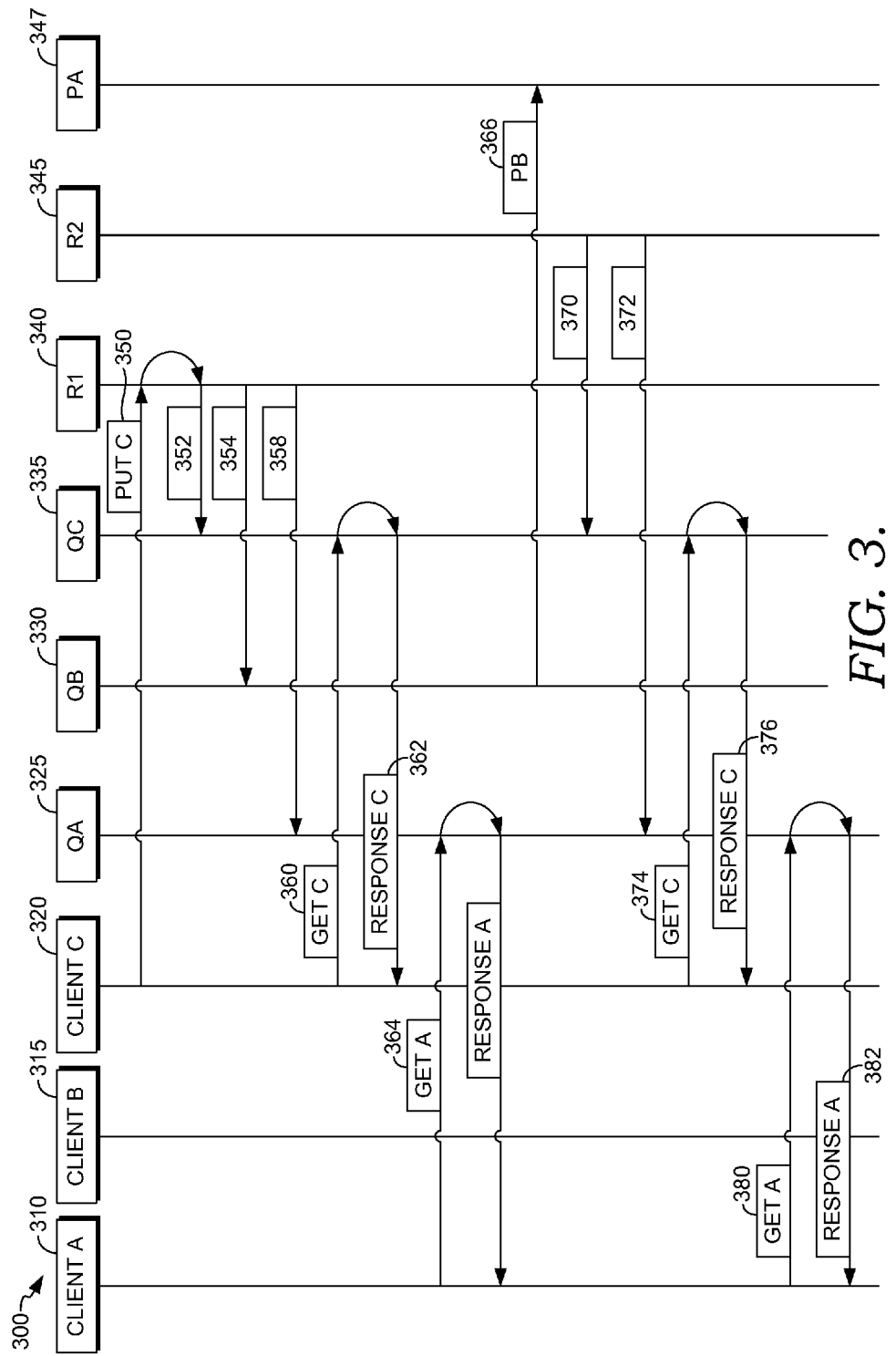
FIG. 3 is a diagram illustrating communications occurring between components when server resources share a connection, in accordance with an embodiment of the present invention.

Turning now to FIG. 3, communications occurring between components when server resources share a connection are shown, in accordance with an embodiment of the present invention. FIG. 3 includes client device A 310, client device B 315, and client device C 320. The client devices may be computing devices similar to computing device 100 described previously with reference to FIG. 1. Exemplary client devices include slates, game consoles, PCs, PDAs, and smart phones.

FIG. 3 also includes notification queue A 325, notification queue B 330, and notification queue C 335. Notification queue A 325 is assigned to client device A 310. Notification queue B 330 is assigned to client device B 315. Notification queue C 335 is assigned to client device C 320. In one embodiment, the relationship between the queues and clients is initially established when a client subscribes to a resource. The resources shown in FIG. 3. include resource 1 340 and resource 2 345. These resources may be similar to the server resources described previously with reference to FIG. 2. The presence agent 347 may track whether clients are still subscribed to a service and are maintaining an active connection, or presence, within a service or to a particular server resource.

Initially, client A 310, client B 315, and client C 320 are subscribed to resource 1 340 and resource 2 345. As described previously, the clients may have sent subscription requests to these resources previously, though they are not shown in FIG. 3. Once subscribed, the resources send notifications addressed to a client ID associated with the client. Those notifications from the various resources are routed to a notification queue associated with a client as will be described subsequently.

Initially, client C 320 communicates a put request C 350 to resource 1 340. The put request 340 causes information within resource 1 340 to be updated. In response to the update, resource 1 340 sends updates that are addressed to each client subscribed to the resource. In this case, update 352 is communicated to client C 320. Because client C's client ID is associated with notification queue C 335, the update message 352 is routed to notification queue C 335. Similarly, update 354 is communicated to notification queue B 330. Update 358 is communicated to notification queue A 325.

Client C 320 communicates get request C 360 to notification queue C 335. In response to get request C 360, response C 362 is communicated back to client C 320. Though shown sequentially after update 352, get request C 360 could have been waiting in notification queue C 335 prior to receiving the update 352. Either way, once updates are received within a notification queue, the updates are communicated to the client in response to a get request. The client may then generate a new get request upon receiving information from a first get request. For example, in this case, client C 320 communicates get request C 374 to notification queue C 335. It should be noted, that a get request directed to a notification queue will cause updates within a notification queue to be communicated to the requesting client device regardless of which server resource provided the update. In other words, a single get request can retrieve information provided by multiple server resources.

Client device A 310 sends get request A 364 to notification queue A 325. Response A 365 is communicated back to client A. Notice, that client B 315 does not send a get request to notification queue B 330. This illustrates, that client B 315 is no longer maintaining a connection with the notification queue B 330. After not receiving any get requests or receiving some other indication that a client is not connected to a notification queue, a presence notification may be generated. In this case, a presence notification 366 is communicated from queue B 330 to presence agent 347. It should be noted, that in this case, queue B 330 includes monitoring components or other functions associated with the queue that allow a presence notification to be generated. In other words, as depicted, notification queue B 330 includes more than just a designated portion of memory for holding messages. In response to receiving the presence notification 366, the presence agent 347 may notify one or more resources to which client B 315 had previously subscribed that client B 315 is no longer connected. This may cause client B 315 to be unsubscribed to the resources.

Update message 370 is communicated from resource 2 345 to notification queue C 335. Update message 372 is communicated from resource 2 345 to notification queue A 325. These update messages may be communicated in response to a change of information within resource 2 345. In this case, a message causing the change is not shown for the sake of simplicity. Also note, that an update message is not communicated to notification queue B 330. This illustrates that the presence agent 347 was effective in unsubscribing client B 315 from resource 2 and resource 1 which, as mentioned earlier, all three clients were subscribed to.

The update is retrieved from notification queue C 335 via get request C 374 and response 376. Similarly, client A 310 retrieves the information using get request A 380 and response 382.

Turning now to FIG. 4, a method 400 for aggregating notifications from multiple server resources addressed to a common client is shown, in accordance with an embodiment of the present invention. Method 400 may be performed on a data center, similar to data center 1 220 described previously with reference to FIG. 2. Similarly, a method 400 could be performed in cooperation with multiple data centers. As described previously, a server resource is a collection of information that is periodically updated. Once updated, client devices subscribing to the server resource are provided the update.

At step 410, a notification queue for a first client device is initialized. The notification queue processes messages generated from multiple server resources. In one embodiment, the notification queue is located within a data center, but on a different computing device than the server resources. The notification queue may be initialized in response to receiving a first subscription request from the first client for the first server resource.

At step 420, a first notification from the first server resource is received at the notification queue. The server resource may address the notification queue using a client ID as a destination address. The notification message is then routed to the notification queue based on the client ID. The routing may use a table that associates client IDs with notification queue addresses. The server resource does not need specific knowledge of the notification queue. It is enough for the server resource to know the identification of clients that have subscribed to the server resource.

At step 430, the first notification is communicated from the notification queue to the client. As described previously, the first notification may be communicated in response to a get message generated by the client. The first notification describes updates to information within the first server resource.

At step 440, a second notification from the second server resource is received at the notification queue. Thus, the notification queue receives notification messages from the first server resource and the second server resource. At step 450, the second notification is communicated from the notification queue to the client.

In one embodiment, the second notification is received from the second server resource through a data center intermediary server that aggregates notifications from multiple server resources within a first data center that are addressed to multiple clients that have notification queues in a second data center. This allows a single connection between the first data center and the second data center to carry notification messages.

Turning now to FIG. 5, a method 500 of communicating with resources in a remote data center is shown, in accordance with an embodiment of the present invention. Method 500 may be performed on a client device that subscribes to multiple resources within a remote data center. The remote data center may actually comprise multiple remote data centers, but will be described as a single remote data center in method 500. The client device may be a computing device similar to computing device 100 described previously with reference to FIG. 1. Exemplary computing devices include game consoles, personal computers, PDAs, laptops, smart phones, slates, digital readers, and other similar devices.

At step 510, a client subscribes to a first server resource and a second server resource associated with a service operating in the remote data center. The client may subscribe to the first and second server resources by sending subscription requests to these services. In one embodiment, the service is a chat room service and the individual resources are chat room resources. A chat room resource may include information related to the ongoing correspondence within the chat room. Thus, the client has subscribed to multiple server resources within the remote data center.

At step 520, a first notification from the first server resource is received through an aggregation component established by the remote data center. In one embodiment, the aggregation component is a notification queue that receives notifications from multiple server resources to which the client subscribes. In another embodiment, the aggregation component maintains a single connection with the client and then connects to all server resources to which the client is subscribed. This allows the data center to maintain a single connection with the client by using an aggregation component that maintains multiple connections with the server resources. This embodiment avoids multiple inefficient connections with a client and exchanges them for multiple connections with the server resources that are more efficient. For example, the connection between the aggregation component and the server resources could be a TCP connection while the connection between the client device and the aggregation component is a HTTP connection.

At step 530, a second notification is received from the second server resource through the aggregation component. This illustrates, that the aggregation component communicates multiple notifications from multiple server resources through a single connection. The aggregation component may also be used to communicate subscription requests between the client and server resources. For example, a second subscription request from the first client for the second server resource could be communicated through the aggregation component. Regardless of the connection type involved, the client device practicing method 500 maintains a connection to the service, or aggregation component, over which notifications are received. In one embodiment, the connection is maintained by continually communicating get requests to the service.

Figure 6:
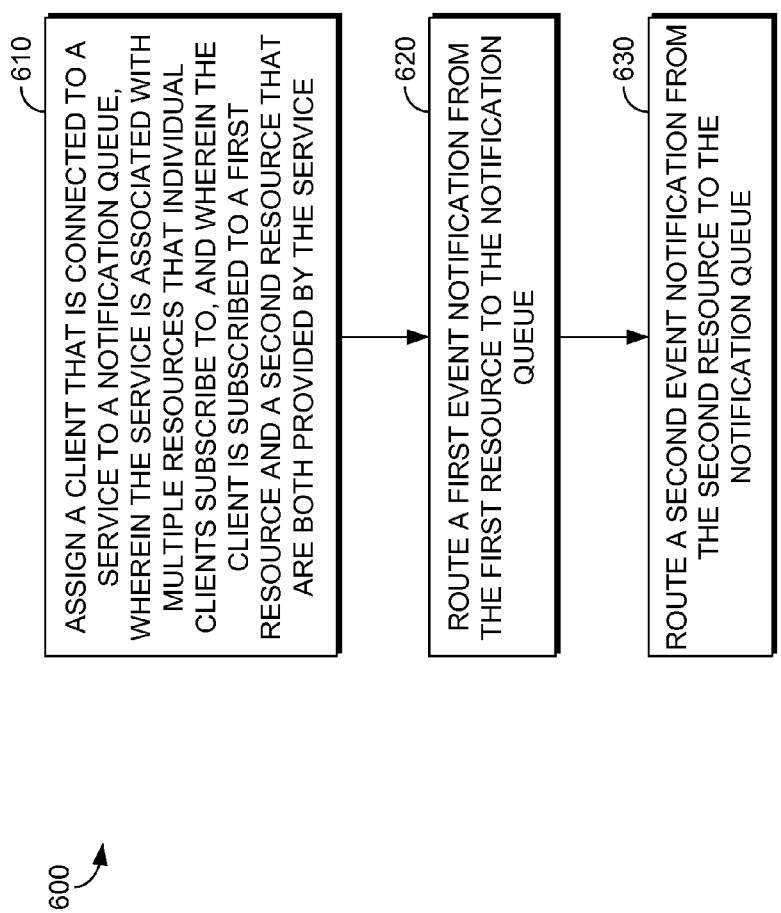
FIG. 6 is a flow chart showing a method of communicating updates from multiple server resources to a client device over a single connection, in accordance with an embodiment of the present invention.

Turning now to FIG. 6, a method 600 of communicating updates from multiple server resources to a client device over a single connection is shown, in accordance with an embodiment of the present invention. Method 600 may be performed on a data center, as described previously. The data center may be in one place, or separated into multiple data centers, that are nevertheless referred to as a single data center within the description of method 600. The client device may be similar to the computing device 100 described previously with reference to FIG. 1.

At step 610, a client that is connected to a service is assigned to a notification queue. The service is associated with multiple resources to which individual clients may subscribe. The service may be similar to service 250 described previously with reference to FIG. 2. Similarly, the server resources may be similar to the server resources described previously with reference to FIG. 2.

At step 620, a first event notification is routed from the first resource to the notification queue. The event notification may communicate a change of information within the first resource. For example, a first event notification may update correspondence within a chat room. The first event notification may be routed based on a client identification that is associated with a client and the notification queue to which the client has been assigned. At step 630, a second event notification is routed from the second resource to the notification queue. This indicates that event notifications from two different resources may be communicated to a single notification queue that is assigned to a single client. Once in the notification queue, the event notifications are communicated to the client device.

In one embodiment, the notification queue is polled periodically to determine whether the client is still connected. A presence notification may be generated and communicated that communicates the client's connection status. In particular, a presence notification may be generated that communicates to one or more server resources that the client is no longer connected to the service. In turn, the server resources may unsubscribe the client automatically.

In the embodiment where the remote data center is broken into multiple remote data centers that are geographically separated, messages communicated between data centers may be first aggregated, communicated across a single channel, and then distributed to notification queues as appropriate based on client identification information provided with the notification messages.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method for aggregating notifications from multiple server resources addressed to a client that is subscribed to the multiple server resources, the method comprising:
 initializing, at a computing device, a notification queue associated with a client identification for the client, the notification queue processing notification messages generated from the multiple server resources to which the client is subscribed;
 receiving, at the notification queue, a first notification message from a first server resource in response to an update of information at the first server resource, the first notification message being addressed to the client identification for the client, the notification queue not querying the first server resource for the first notification message;
 in response to a first request from the client, communicating the first notification message from the notification queue to the client;
 receiving, at the notification queue, a second notification message from a second server resource in response to an update of information at the second server resource, the second notification message being addressed to the client identification for the client, the notification queue not querying the second server resource for the second notification message, the second notification message being received from the second server resource through a data-center intermediary server that aggregates notification messages from the multiple server resources within a first data center that are addressed to multiple clients that have notification queues in a second data center, thereby allowing a single connection between the first data center and the second data center to carry the notification messages, the first notification message and the second notification message being communicated between the notification queue and the client through a stateless front-end machine that performs a load balancing function; and
 in response to a second request from the client, communicating the second notification message from the notification queue to the client.

2. The method of claim 1, wherein the first server resource and the second server resource comprise chat room content.

3. The method of claim 1, wherein the notification queue is located within a data center and on a different computing device than the first server resource and the second server resource.

4. The method of claim 1, wherein the method further comprises:
 receiving a first subscription request from the client for the first server resource; and
 receiving a second subscription request from the client for the second server resource.

5. The method of claim 1, wherein the first notification message and the second notification message are communicated between the notification queue and the client using one or more of a comet-style hypertext transfer protocol ("HTTP") connection and a transmission control protocol ("TCP") connection.

6. The method of claim 1, wherein the method further comprises:
 generating a presence that communicates to at least one of the first server resource and the second server resource that the client is no longer connected to that at least one of the first server resource and the second server resource.

7. A method of communicating with resources in a remote data center, the method comprising:
 subscribing to a first server resource and a second server resource associated with a service operating in the remote data center;
 receiving a first notification message from the first server resource in response to an update of information at the first server resource, the first notification message received through a notification queue at an aggregation component established by the remote data center, the first notification message including a client identification associated with the notification queue; and
 receiving a second notification message from the second server resource in response to an update of information at the second server resource, the second notification message received through the notification queue at the aggregation component, the second notification message including the client identification associated with the notification queue, the notification queue not querying the first and second server resources for the first and second notification messages, the second notification message being received from the second server resource through a data-center intermediary server that aggregates notification messages from the multiple server resources within a first data center that are addressed to multiple clients that have notification queues in a second data center, thereby allowing a single connection between the first data center and the second data center to carry the notification messages, the first notification message and the second notification message being communicated between the notification queue and a client through a stateless front-end machine that performs a load balancing function.

8. The method of claim 7, wherein the method further comprises:
 communicating a first subscription request from a first client for the first server resource; and
 communicating a second subscription request from the first client for the second server resource.

9. The method of claim 7, wherein the method further comprises communicating an HTTP Get request to the notification queue operating on the aggregation component.

10. The method of claim 7, wherein the first server resource and the second server resource are chat room instances.

11. The method of claim 7, wherein the method further comprises maintaining a connection to the service over which notifications are received.

12. The method of claim 7, wherein the method further comprises:
 generating a presence that communicates to at least one of the first server resource and the second server resource that the client is no longer connected to that at least one of the first server resource and the second server resource.

13. A computing system comprising:
 a processor; and
 computer storage memory having computer-executable instructions stored thereon which, when executed by the processor, implement a method of communicating updates from multiple sever resources to a client device over a single connection, the method comprising:

assigning a single client to a single notification queue and associating a client identification for the single client with the single notification queue, wherein the single client is subscribed to a service that is associated with multiple resources that individual clients subscribe to, and wherein the single client is subscribed to a first resource and a second resource that are both provided by the service;

automatically routing a first event notification from the first resource to the single notification queue, wherein the routing is based on the client identification for the single client; and automatically routing a second event notification from the second resource to the single notification queue, wherein the routing is based on the client identification for the single client, the single notification queue not querying the first and second resources for the first and second event notifications, the second event notification being received from the second resource through a datacenter intermediary server that aggregates event notifications from the multiple resources within a first data center that are addressed to multiple clients that have notification queues in a second data center, thereby allowing a single connection between the first data center and the second data center to carry the event notifications, wherein the first event notification and the second event notification are communicated between the single notification queue and the single client through a stateless front-end machine that performs a load balancing function.

14. The system of claim 13, wherein the service operates in a data center comprising multiple computing devices, and wherein the single notification queue is assigned to a different computing device than the service.

15. The system of claim 13, wherein the first event notification describe a change in state within the first resource.

16. The system of claim 13, wherein the first resource and the second resource are chat room instances.

17. The system of claim 13, wherein the single client is a media playback device and the service synchronizes a media play state.

18. The system of claim 13, wherein the method further comprises polling the single notification queue to determine whether the single client is still connected to the service and generating a presence notification that communicates a connection status for the single client.

19. The system of claim 13, wherein the first resource operates in a first data center and the second resource operates in a second data center, wherein the single notification queue operates in the first data center, and wherein the second event notification from the second resource is aggregated with multiple event notifications from the second data center and communicated to the first data center.

20. The system of claim 13, wherein the first resource is a shared data resource.

* * * * *